Patented Aug. 31, 1954

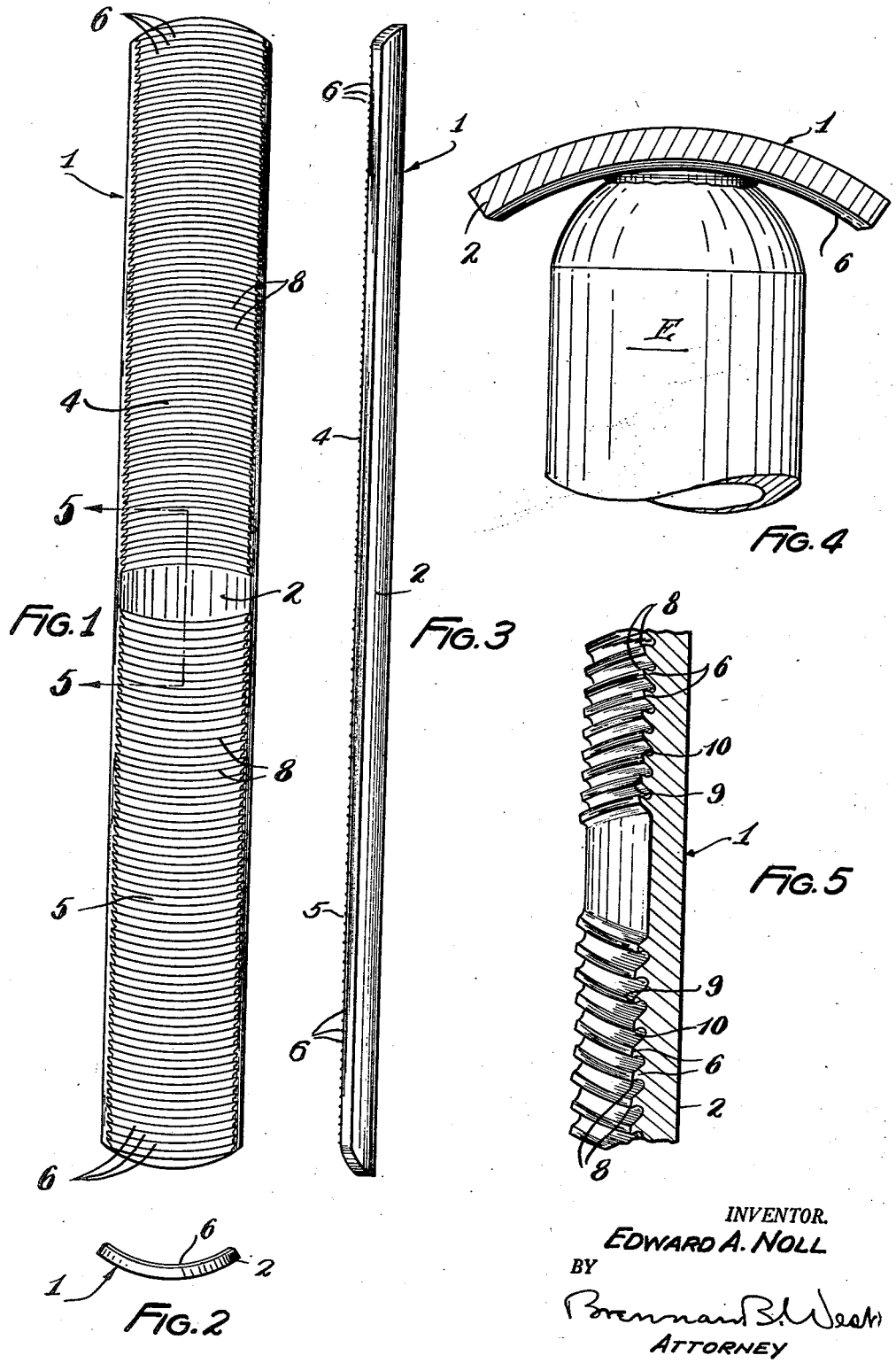

2,687,562

UNITED STATES PATENT OFFICE 2,687,562

FILE

Edward A. Noll, Bay Village, Ohio, assignor to The Nolvex File Company, Cleveland, Ohio, a corporation of Ohio Application May 6, 1953, Serial No. 353,413

3 Claims. (Cl. 29—78)

This invention is an improved file especially suited to the reconditioning of electrodes of the tip or disc types used in welding machines.

The intense heat and pressure to which such electrodes are subjected in use cause the contact ends of the tips and the peripheries of the discs to become deformed or mushroomed, making it necessary to occasionally remove the displaced metal.

An object of my invention is to provide a file especially suited to the purpose aforesaid that is of a size and shape enabling it to be operated in the restricted space between opposed electrodes of a machine without having to remove or retract the electrodes.

Another object is to provide a file that will traverse the tip or periphery of an electrode without tending to shift laterally on the electrode or out of engagement therewith, thus greatly facilitating and expediting the operation of recondtioning an electrode.

A further object is to provide a file having teeth of such shape and character that the teeth will tend to deflect and shed the removed metal, thus preventing entirely or to a very great extent the clogging of the teeth.

It is a still further object of the invention to provide a file for the above mentioned purpose having two working faces of the same or different tooth spacing; in the former instance, for the purpose of doubling the life of the file, and in the latter, to enable the major part of the displaced metal to be quickly roughed off by the coarser toothed working face of the file, and the remainder of the displaced metal to be removed and the surface of the electrode made smooth by means of the finer toothed face.

In the following description, reference is made to the accompanying drawing wherein like parts are designated by like characters in the different views.

In the drawing,

Fig. 1 is an elevational view showing the concaved side of the file body and revealing the working faces;

Fig. 2 is an end view of the file;

Fig. 3 is a side elevational view;

Fig. 4 is an enlarged detail showing the file in cross section operating upon an electrode, and Fig. 5 is an enlarged fragmentary sectional side elevation of the file, the plane of section being indicated by the line 5—5 of Fig. 1.

The file designated generally by the reference numeral 1 consists of an elongate body 2 constructed of a strip of suitable metal of appropriate thickness that is transversely curved. Said body is separated approximately midway of its ends into working faces 4 and 5. Each of the faces is characterized by substantially parallel arcuate teeth 6. The teeth of each face are curved outwardly from end to end toward the adjacent end of the body and, as best shown in Fig. 5, the sharp cutting edges 8 of the teeth of each face point in the direction of the near end of the body. Rearwardly of the cutting edge of each tooth is a relief area 9, and between such area and the cutting edge of the adjacent tooth to the rear is a groove or land 10 of ample capacity to carry off the metal removed by the teeth during a working operation. It will be noted that the front wall, so to speak, of each land joins the adjacent relief area 9 at an obtuse angle, while the rear wall of the land joins the cutting edge of the adjacent tooth at an acute angle. As a result, each tooth is undercut adjacent its cutting edge so that the removed metal will follow with minimum resistance the front wall of the land. The cross-sectional shape of the lands prevents clogging, and their curvature transversely of the working face causes the removed metal to flow laterally and be discharged as the file is manipulated.

As shown in the drawing, the teeth of the working face 4 are closer together than those of the working face 5, producing what may be referred to as a fine toothed face and a coarse toothed face. It will be understood that, in the use of the file, one end of the body is grasped by the hand of the operator, in the manner of a handle, so that the working face that occupies the projecting end of the file may be used. The ends of the teeth along each side of the file are chambered and the convex surface of the body is smooth, insuring comfort to the user when either end of the body is employed as a handle.

In the reconditioning of an electrode E, as illustrated in Fig. 4, the coarser working face 5 may be used to remove the major part of the displaced metal of the electrode, after which the file may be reversed in the hand of the operator and the face 4 employed to remove the remaining part of the displaced metal and smooth the reconditioned surface of the electrode.

Having thus described my invention, what I claim is:

1. A file comprising an elongate body having a concave surface of transverse curvature throughout its length, said surface being divided intermediate its ends into two working faces, each working face being characterized by substantially parallel teeth extending entirely across the body and having their cutting edges directed toward the end of the body that defines one end of said working face, the ends of the teeth along the lateral edges of the body being chamfered.

2. A file comprising a relatively narrow elongate and comparatively thin body of substantially uniform thickness, the same being transversely curved, the concaved surface of said body being divided intermediate its ends into two working faces, each working face being characterized by arcuate, substantially parallel teeth extending crosswise of the body and described from centers approximately coincident with the longitudinal axis of the body, each tooth of each working face having its cutting edge on the outer side of the arc and directed toward the end of the body that defines one end of the corresponding working face.

3. A file according to claim 2, wherein the ends of the teeth along the lateral edges of the body are chamfered.

References Cited in the file of this patent

UNITED STATES PATENTS

| Number | Name | Date |
|---|---|---|
| 934,882 | Boswell | Sept. 21, 1909 |
| 1,829,385 | Anheuser | Oct. 27, 1931 |
| 2,298,633 | Winlock et al. | Oct. 13, 1942 |
| 2,343,271 | Anheuser | Mar. 7, 1944 |